United States Patent [19]

Mueller

[11] Patent Number: 4,577,059

[45] Date of Patent: Mar. 18, 1986

[54] DECODING PROCESS AND APPARATUS

[75] Inventor: Kurt H. Mueller, Wallisellen, Switzerland

[73] Assignee: GRETAG Aktiengesellschaft, Regensdorf, Switzerland

[21] Appl. No.: 454,414

[22] Filed: Dec. 29, 1982

[30] Foreign Application Priority Data

Jan. 29, 1982 [CH] Switzerland ............... 558/82
Apr. 2, 1982 [CH] Switzerland ............ 2046/82

[51] Int. Cl.[4] ............... H04K 1/02; H04L 9/02
[52] U.S. Cl. .................... 178/22.17; 178/22.13
[58] Field of Search ............ 371/32, 37, 42, 46, 371/47; 178/22.17, 22.13

[56] References Cited

U.S. PATENT DOCUMENTS

| 3,473,150 | 10/1969 | McClelland | 371/32 |
| 3,665,393 | 5/1972 | Brune et al. | 371/32 |
| 4,144,522 | 3/1979 | Kageyama et al. | 371/32 |
| 4,145,683 | 3/1979 | Brookhart | 371/42 |
| 4,172,213 | 10/1979 | Barnes et al. | 371/37 |
| 4,377,863 | 3/1983 | Legory et al. | 371/42 |

FOREIGN PATENT DOCUMENTS 2519369 6/1976 Fed. Rep. of Germany ........ 371/32

Primary Examiner—Salvatore Cangialosi
Attorney, Agent, or Firm—Burns, Doane, Swecker & Mathis

[57] ABSTRACT

A decoding system containing a synchronizing and entry detector rendering possible the phase-in of messages delayed, for example, by interference. In order to be able to decode parts of the message received prior to phase-in, the cipher is stored intermediately from the onset of reception in a memory. Following the completion of the transmission, the decoding generator is set to an initial state corresponding to the phase-in and operated in the inverse direction from there. Simultaneously the intermediately stored cipher is called up in an inversed order from the memory and decoded with the key pulse sequence of the decoding generator.

9 Claims, 3 Drawing Figures

DECODING PROCESS AND APPARATUS

BACKGROUND OF THE INVENTION

The invention relates to a decoding process and apparatus in which a cipher transmitted with recurring phase-in information is decoded by detecting the phase-in information and generating a key pulse sequence related to the phase-in information, and more particularly, to a novel decoding process and apparatus which permits the decoding of parts of the cipher received before detection of the phase-in information.

In high frequency (HF) message transmission, frequently a so-called broadcast operation is customary when transmitting a certain message from a control station to a series of receivers. Such a receiver is often unable to request, by means of call-backs, a repetition of the messages in the case of messages received with interference or in fragments only, for example, because as a pure receiver it does not have an emitter, or because it must not break radio silence for tactical reasons.

By using error correcting codes in such cases it is often possible to improve the likelihood of successful transmission but many of these codes—particularly the blocking codes—require synchronization, which the receiver must first establish. The same is true for coding, wherein the emitting and receiving stations must first be brought into step by an initial synchronization. Should the receiver be unable to effect this, no decoding is possible. Generally, in such cases the receiver must receive two items of information correctly: the cryptoinformation and the starting time. The first may consist of an auxiliary key, a coded message key or the like, and its purpose is to effect the automatic changing of the code program for each transmission; the second defines the starting time and thus the crypto-synchronization. The crypto-information and starting time together are generally designated the so-called entry or phase-in information.

In keeping with its importance, this entry or phase-in information is transmitted redundantly at the start of the message so that in spite of a certain number of transmission errors decoding is still possible.

However, particularly in the case of HF transmission, such safeguarding is still unsatisfactory, because as the result of fading or strong interference the phase-in information may be completely lost; the effect is then the same as if the receiver would have been actuated too late.

A substantially better performance is obtained if the phase-in information is repeated during the transmission periodically or aperiodically, in certain intervals. The use of such a procedure is described for example in the article "9EC755 Digital Voice CipherSystem for Defense Applications" by G. Baltzer in Philips Telecommunications Review, March 1981. If as the result of strong interference, for example, the first three transmissions of the phase-in information, the so-called late entry points, are missed, synchronization may be accomplished the next time and at least the remaining part of the message decoded. Once synchronization is established, it is frequently possible to hold during any later interference, provided that the generators on both the emitting and the receiving side are operating continuously and the existing phase-in information defines an instantaneous position (in the coded form). This provides the receiver with the opportunity to retest its correct synchronism at each late entry point.

The disadvantage of this system is obvious: the parts of the message arriving prior to synchronization cannot be decoded and are thus lost. As is very frequently the case, with tactical reports, for example, the correct reception of even the smallest part of a report may be extremely important, this disadvantage is often problematic and severe.

OBJECTS AND BRIEF SUMMARY OF THE INVENTION

It is the object of the present invention to eliminate this shortcoming of known decoding systems and in particular to provide an improved apparatus of the aforedefined type whereby the decoding of essentially all of the message parts received may be effected independently of the phase-in point in time.

The process and the apparatus according to the invention, including various advantageous embodiments are set forth in the appended claims.

The state of a coding/decoding generator is, as is known, determined by its state vector, while obviously there are further degrees of freedom, which define the algorithm and may be used as secret key information. At least parts of the state vector are altered by the stepping of the generator. It is necessary to correlate this state vector with the aid of the information transmitted during the late entry points. The decoding of information transmitted prior to the successful phase-in may be effected according to the invention in two ways:

(a) During the reception of a message—even if the phase-in information has not been received—all incoming data are stored. This storage may be actuated, for example, by the reception of a carrier signal at a specific frequency. As soon as the phase-in has been accomplished, normal decoding is performed, while the initial phase-in information remains stored. At the end of the transmission—based on the phase-in information—the initial part of the message not decoded earlier, is decoded. This is effected by running the decoding generator backwards from the point in time of the phase-in and calling up the previously stored cipher bit by bit in the backward direction from the memory parallel to the course of the decoding generator. It is necessary for this backwards decoding to be able in the case of an algorithm to determine selectively from a given state vector the following or preceding vector with a comparable computing effort. The manner in which such states may be defined is well known and is described, for example, in EP-A-0 No. 027 or DE-A No. 2943726.

(b) From the correctly received phase-in information the point in time and the phase-in information of earlier entry time points are determined. From there, decoding may be effected in the forward direction. It is obviously being assumed that the correlation between the different phase-in information is known.

Different variants are possible in both cases:

The decoded text is printed out immediately upon receipt; the missing beginning is attached to the end. As therefore only the onset of the cipher is stored, little memory space is required.

The entire text is stored (coded or clear), the missing parts completed following decoding according to the present invention and the text printed out as a whole; in this variant the memory must be adequate to store the entire message.

By means of a type of multitask operation, earlier gaps may be completed during the reception so that as the result of the printout (and emptying of the memory) further ciphers may be started during the reception.

BRIEF DESCRIPTION OF THE DRAWINGS

The invention will become more apparent to one skilled in the art to which it pertains from the following detailed description when read with the aid of the drawings in which.

DETAILED DESCRIPTION

Figure 1:
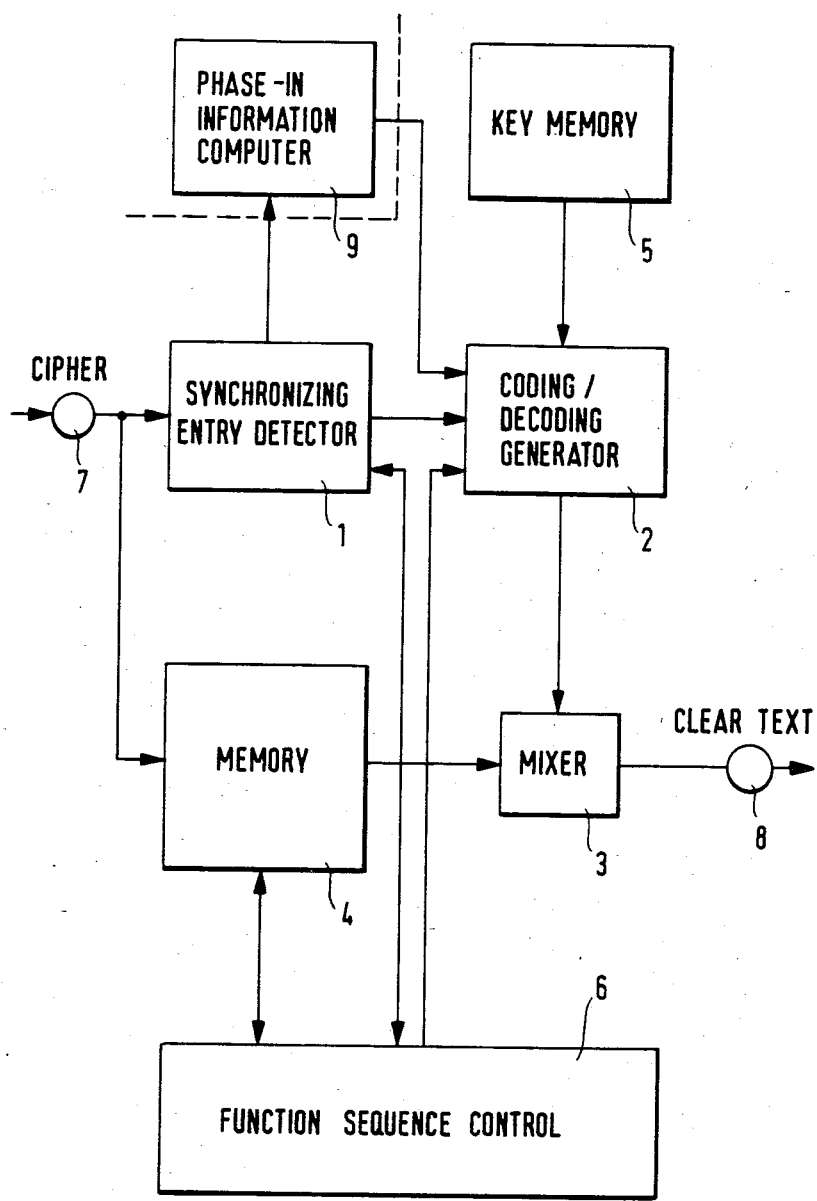
FIG. 1 is a simplified block circuit diagram illustrating one exemplary embodiment of a decoding apparatus according to the invention.

The apparatus illustrated in FIG. 1 comprises, in addition to numerous other parts which are well known and unnecessary to an understanding of the present invention, a synchronizing and entry detector 1, a coding/decoding generator 2 and a connecting element in the form of a Modulo-2-Mixer 3, a work memory 4, a key memory 5 and a function sequence control device 6, together with a cipher input port 7 and a clear or decoded test output port 8. As an alternative for forwarding decoding of stored ciphers, a phase-in information computer 9 is further provided. Naturally, as customary in advanced equipment of this type, the individual parts are extensively implemented by a suitably programmed micro-computer system.

The cipher is transmitted at the onset of the transmission to the detector 1 and is simultaneously stored in the memory 4. As soon as the detector 1 receives phase-in information without interference, it effects in the usual manner, in cooperation with the function sequence control 6, the actuation of the coding/decoding generator 2, i.e., the determination of the state vector of the decoding generator, whereupon the generator initiates the production of the key pulse sequence required for the decoding process. The generator runs forward in this operation, i.e., in the same direction as the generator on the sending end. The key pulse sequence generated in this manner is then combined in a known manner, in the Modulo-2-Mixer 3, with the cipher being further received, and the cipher is thereby decoded.

Figure 3:
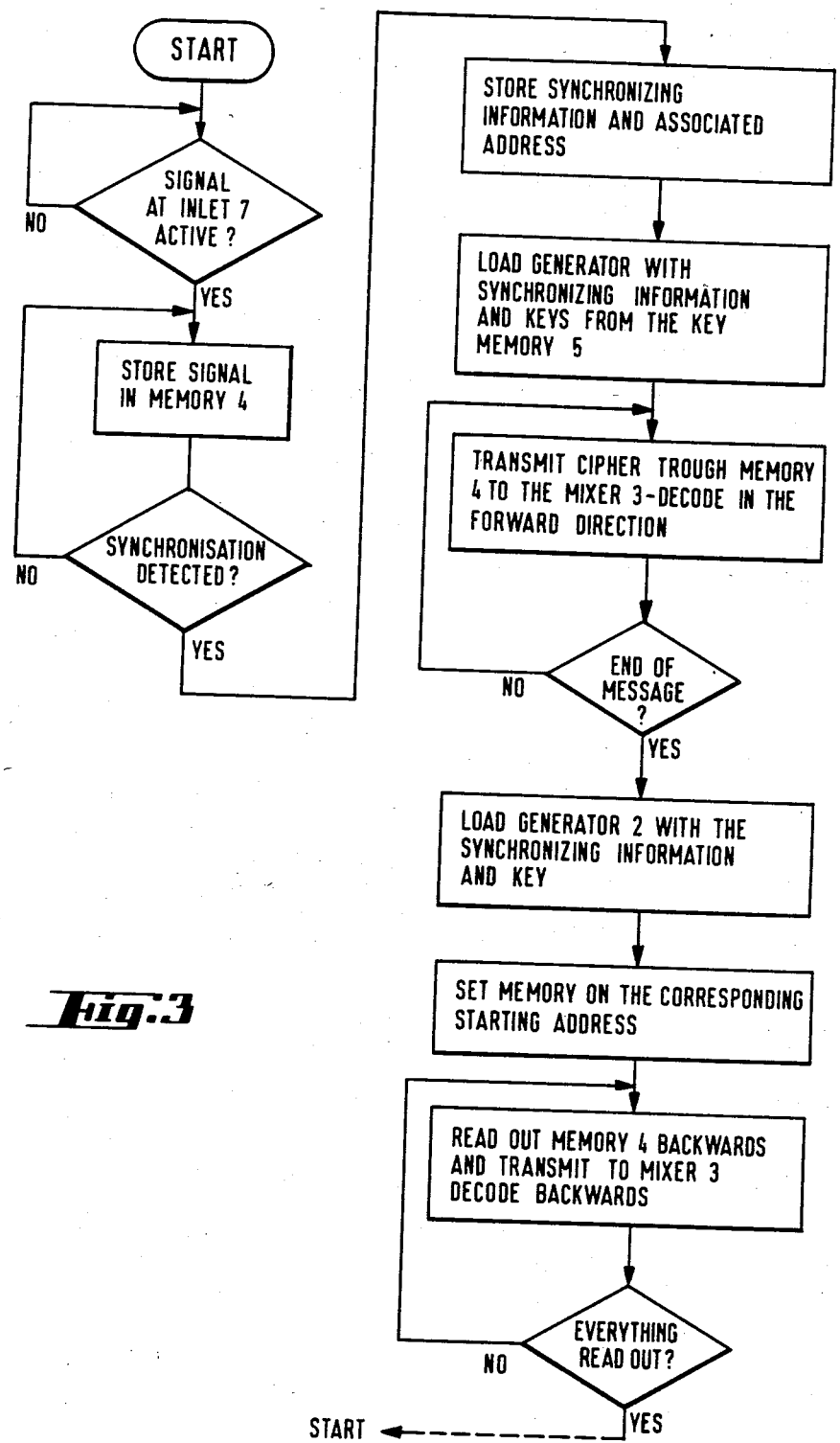
FIG. 3 is a flow chart of the process according to the invention.

When the transmission of the message is completed, the function sequence control 6 causes the coding/decoding generator 2 to be returned to the initial state to which it has been set during the phase-in and to run from there in the backwards direction. It thereby generates a key pulse sequence exactly corresponding—except for the reversal in time—to the sequence produced by the coding generator on the sending end prior to the accomplishment of phase-in. With this key pulse sequence, running back into the past from the phase-in state, as it were, the part of the cipher received prior to phase-in is now decoded by reading it out from the memory 4 in an order reversed in time and mixing the reverse ordered cipher with the time reversed key pulse sequence. The initial part of the message decoded in this manner is then simply attached to the rest of the decoded message. In FIG. 3, this process sequence is again shown in a comprehensive manner in the form of a flow chart.

As was mentioned earlier, it is obviously possible to store the clear or decoded text until all of the parts of the cipher are completely decoded and print it out only then in the correct sequence. It is further naturally feasible to effect the decoding of message sections located prior to the phase-in "in-between", i.e., when the computer is not occupied by other tasks. The invention is not restricted in any way in this regard.

The synchronizing and entry detector 1 is of a conventional configuration, corresponding essentially, for example, to the detector used in the coding system CG 505 of the present applicant. The coding/decoding generator 2 must obviously be of a type that may be operated in both directions. Most of the currently used generators operating on the basis of regenerative shift registers are suitable for this purpose or at least may be readily adapted to this purpose in a fashion well known to persons skilled in the art.

Figure 2:
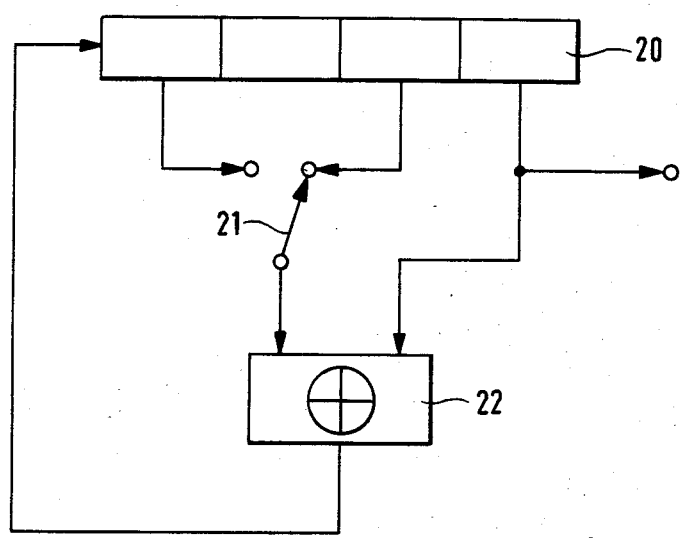
FIG. 2 is a block diagram of a coding generator operable in the forward and the backward direction.

A simplified example of such a coding generator is shown in FIG. 2. It comprises a four-stage shift register 20, an alteration or reversal switch 21 and an exclusive-or gate 22. For the forward operation, the fourth and third register stages are back-coupled to the input through the gate 22; for backward operation, the fourth and first stages are coupled back to the input of the register 20 through the gate 22.

Further examples of coding generators operable in both directions are described for example in F. J. Furrer: "Error Correcting Block Coding for Data Processing", Chapter 8. Birkhauser Verlag Press, Basel 1981 and V. S. Pless: "Encyrption Scheme for Computer Confidentiality", IEEG Transactions on Computers, Vol. C-26, No. 11, November 1977, p. 1133–1136. All other parts of the apparatus are, as mentioned hereinabove, standard microprocessor system components or software routines, with no explanation required for those skilled in the art. Obviously, the coding generator itself may also be implemented in part or entirely by software.

As discussed hereinabove, in place of the backwards decoding process, it is possible to recompute from the point at which phase-in had been accomplished back in time to the start of the informaton and then set the coding/decoding generator 2 to the key pulse information computed in this manner, whereupon the (stored) cipher may be decoded in a normal forward fashion. A precondition is on the one hand that the missing or mutilated parts of the message did not cause a bit slip (stored bits may be incorrect, but their number must be accurate), and on the other, that the successive phase-in data are not arbitrary but are interrelated according to a formation rule known on the receiver side; this is true for certain known coding/decoding systems. The computation of earlier phase-in information is effected in the phase-in information computer 9, which naturally again is not an independent unit, but may be realized by software.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. Decoding process wherein phase-in information contained in a transmitted cipher in time intervals is detected and a coding/decoding generator is set in accordance therewith, and wherein the cipher is intermixed with a key pulse sequence generated by the coding/decoding generator set to said phase-in information, the process comprising the steps of intermediately storing the cipher in an intermediate memory at least to the first detection of phase-in information, and operating the coding/decoding generator backwards from an initial state determined by said phase-in information while recalling the intermediately stored cipher from the intermediate memory in the reverse direction of storage and intermixing said recalled cipher with the key pulse sequence produced by the backwards running coding/decoding generator to thereby decode the intermediately stored cipher.

2. Decoding process according to claim 1 wherein the decoding of the intermediately stored cipher with the coding/decoding generator running in the reverse direction is effected following the normal forward decoding of the cipher parts received after the detected phase-in.

3. Decoding process according to claim 1 wherein the decoding of the intermediately stored cipher is effected with the coding/decoding generator running backwards during a period of normal forward coding.

4. Decoding process wherein, phase-in information contained in transmitted cipher in time intervals is detected and a coding/decoding generator is set to an initial state determined by said information and wherein the cipher is then intermixed with a key pulse sequence produced by the coding/decoding generator set in this manner, the process comprising the steps of storing the cipher intermediately at least until detection of phase-in information, from this detected phase-in information, computing earlier phase-in information at the onset of the message transmission, setting the coding/decoding generator to an initial state determined by said earlier phase-in information, and operating the coding/decoding generator beginning with said initial state while intermixing the intermediately stored cipher with the key pulse sequence produced by the coding/decoding generator set in this manner, the intermediately stored cipher thereby being decoded.

5. Decoding process according to claim 4 wherein the entire cipher is stored intermediately until the earlier phase-in information is determined and the coding/decoding generator is set accordingly.

6. Process according to claim 4 wherein the decoding of cipher parts arriving prior to phase-in is effected subsequently to the normal decoding of cipher parts arriving after the phase-in.

7. Decoding apparatus for decoding a transmitted cipher containing phase-in information in time intervals therein comprising a cipher input, a synchronizing and entry detector connected to said input, a coding/decoding generator with an associated coding key memory, a mixer for mixing the cipher with a key pulse sequence produced by said generator, a central function sequence control device operatively connecting all the said parts of the decoder with each other and with a clear message output, the coding/decoding generator being settable to an initial state determined by the phase-in information recognized by the detector and being selectively operable forwardly and backwardly, a memory for at least part of the cipher, the function sequence control being operable to call up the cipher from the memory in a sequence inverse to the sequence of the initial storage in said memory and to transmit said cipher, together with the key pulse generator produced by the backwards running coding/decoding generator, to the mixer.

8. Decoding apparatus for decoding a transmitted cipher containing phase-in information in time intervals therein comprising a cipher input, a synchronizing and entry detector connected to said input, a coding/decoding generator with an associated coding key memory, a mixer for mixing the cipher with a key pulse sequence produced by the generator, a central function sequence control device operatively interconnecting all of the said parts and a clear text outlet, the coding/decoding generator being settable to an initial state determined by phase-in information recognized by the detector, a memory for at least part of the cipher, a phase-in information computer for back-computing, from phase-in information recognized by the synchronizing and entry detector, earlier phase-in information dependent on said detected phase-in information, the function sequence control setting the coding/decoding generator to an initial state determined by said earlier phase-in information in order to intermix the cipher intermediately stored in the memory with the key pulse sequence produced by the generator set in this manner, thereby decoding said cipher.

9. Decoding apparatus for decoding a transmitted cipher containing phase-in information recurring in time intervals in the cipher comprising detector means connected to receive said cipher for detecting phase-in information therein, means for detecting the start of receipt of the cipher, coding key sequence generator means for generating a coding key sequence which commences at a point in the sequence determined by the detected phase-in information, the coding key sequence generator being selectively operable to generate the coding key sequence in a forward or a backward direction, an intermediate memory for storing at least part of the received cipher, means for mixing the coding key sequence with the cipher stored in said memory in accordance with the proper time relationship between the received cipher and the phase-in information contained in the cipher in response to the detected start of the cipher and the initial detection of the phase-in information to thereby decode the entire cipher.

* * * * *